(12) United States Patent
Toth et al.

(10) Patent No.: US 7,349,420 B1
(45) Date of Patent: Mar. 25, 2008

(54) METHOD AND SYSTEM FOR PRESERVING CHANNEL BANK PROVISIONING INFORMATION WHEN UNIT LOCATION CHANGES WITHIN MULTI-SHELF EQUIPMENT RACK

(75) Inventors: Robert James Toth, Huntsville, AL (US); Neil M. Jensen, Madison, AL (US); Dennis B. McMahan, Huntsville, AL (US); Timothy David Rochell, Elkmont, AL (US)

(73) Assignee: Adtran, Inc., Huntsville, AL (US)

( * ) Notice: Subject to any disclaimer, the term of this patent is extended or adjusted under 35 U.S.C. 154(b) by 772 days.

(21) Appl. No.: 10/930,102

(22) Filed: Aug. 31, 2004

(51) Int. Cl.
*H04J 3/16* (2006.01)
(52) U.S. Cl. ..................................... 370/437
(58) Field of Classification Search ............... 370/437, 370/462, 468, 360, 443, 477, 431, 389, 535, 370/356, 397, 399, 409, 461, 395.3
See application file for complete search history.

(56) References Cited

U.S. PATENT DOCUMENTS 7,209,477 B2 * 4/2007 Pike ........................... 370/360

* cited by examiner

*Primary Examiner*—Chi Pham
*Assistant Examiner*—Alexander O. Boakye
(74) *Attorney, Agent, or Firm*—Allen, Dyer, Doppelt, Milbrath & Gilchrist, P.A.

(57) ABSTRACT

An inter-channel bank addressing and identification protocol, for use with a multi channel bank, digital subscriber line access multiplexer (DSLAM), enables the control processor of a master channel bank to selectively communicate with control processors of subtended slave channel banks, and allows a subtended slave shelf to retain provisioning information, irrespective of a change in shelf location or removal of a subtended slave shelf between the master shelf and another subtended slave shelf. The inter-channel bank addressing and identification protocol uses a shelf address code that is controllably incremented or decremented during the transport of a packet between the master and a slave shelf. In addition, a shelf address code is assigned each slave shelf during initialization. These two codes enable the master to track which channel bank is in which shelf bay.

15 Claims, 5 Drawing Sheets

| 15 | | | | | | | | 8 | 7 | | | | | | 0 |
|---|---|---|---|---|---|---|---|---|---|---|---|---|---|---|---|
| ACK | NAK | AD3 | AD2 | AD1 | ID3 | ID2 | ID1 | CF2 | CF1 | PC5 | PC4 | PC3 | PC2 | PC1 | PC0 |
*FIG. 5*
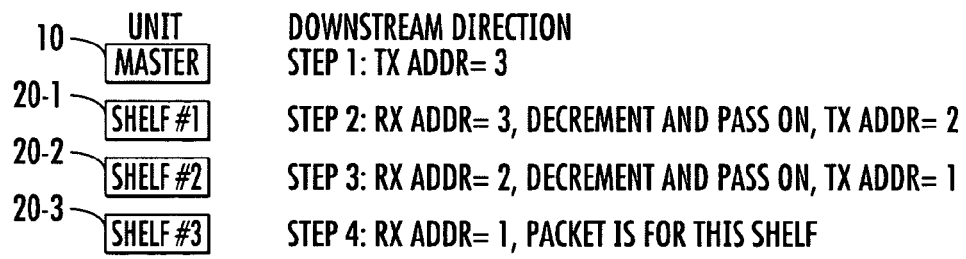
DOWNSTREAM DIRECTION
STEP 1: TX ADDR= 3
STEP 2: RX ADDR= 3, DECREMENT AND PASS ON, TX ADDR= 2
STEP 3: RX ADDR= 2, DECREMENT AND PASS ON, TX ADDR= 1
STEP 4: RX ADDR= 1, PACKET IS FOR THIS SHELF
*FIG. 6*
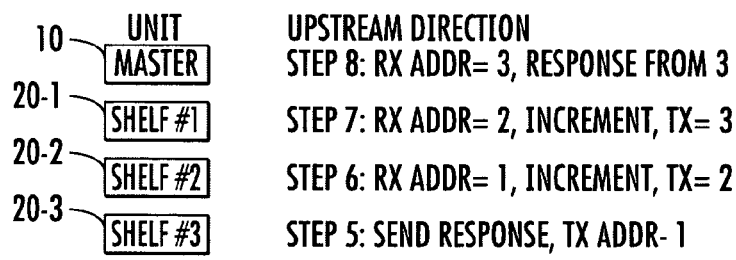
UPSTREAM DIRECTION
STEP 8: RX ADDR= 3, RESPONSE FROM 3
STEP 7: RX ADDR= 2, INCREMENT, TX= 3
STEP 6: RX ADDR= 1, INCREMENT, TX= 2
STEP 5: SEND RESPONSE, TX ADDR- 1
*FIG. 7*
| 0 | 0 | 1 | 1 | 1 | 1 | 1 | 1 | "WHO ARE YOU" |
|---|---|---|---|---|---|---|---|---|
*FIG. 8*
| 0 | 0 | 0 | 0 | 1 | 1 | 1 | 1 | "WHO ARE YOU" |
|---|---|---|---|---|---|---|---|---|
*FIG. 9*

| 0 | 0 | 0 | 0 | 1 | 0 | 0 | 1 | "ASSIGN SHELF ID" |

| 1 | 0 | 0 | 0 | 1 | 0 | 0 | 1 | "ASSIGN SHELF ID" |

METHOD AND SYSTEM FOR PRESERVING CHANNEL BANK PROVISIONING INFORMATION WHEN UNIT LOCATION CHANGES WITHIN MULTI-SHELF EQUIPMENT RACK

CROSS-REFERENCE TO RELATED APPLICATION

The present application relates to subject matter disclosed in co-pending U.S. patent application Ser. No. 10/930,101 (hereinafter referred to as the '101 application), filed on Aug. 31, 2004, entitled: "System Architecture for Linking Channel Banks of a Data Communication System," by R. Burch et al, assigned to the assignee of the present application, and the disclosure of which is incorporated herein.

FIELD OF THE INVENTION

The present invention relates in general to telecommunication systems and subsystems thereof, and is particularly directed to an inter-channel bank communication mechanism, especially a shelf addressing and identification protocol, that is adapted for use in a multi channel bank, digital subscriber line access multiplexer (DSLAM) architecture of the type described in the '101 application, and which is operative to enable the control processor of a master transceiver or shelf to selectively communicate with control processors of subtended expansion channel bank transceivers or shelves, and allows a subtended shelf to retain provisioning information, irrespective of a change in shelf location or removal of an expansion shelf between the master shelf and the subtended shelf.

BACKGROUND OF THE INVENTION

As described in the '101 application, an on-going objective of the telecommunications industry is to increase the number of customers that may be serviced by a single channel bank connection with a network, such as but not limited to a DS3 or OC3 network connection. In the past, this objective has been dealt with primarily by using either bus extension or channel bank subtending. According to the bus extension approach, the physical length of the backplane bus of a master channel bank is increased by means of a bus extension (e.g., ribbon) cable, in order to allow more line cards to be daisy chain-connected to the bus. In this type of architecture, upstream directed data (from the customer to the network) passes from a customer interface with a line card onto the bus extension, and then into the switching fabric through which a connection with the network is afforded, using a policing engine (a flow control mechanism) resident within the switch fabric of the master channel bank. Downstream directed data (from the network to a customer) enters the switch fabric where it is scheduled for downstream routing, and then transported across the bus extension into a line card and passed on to the customer. Information concerning policing, scheduling and queuing engines is contained in ITU-T Recommendation I-371 Traffic Control and Congestion Control for B-ISDN.

In the second approach, multiple line card slots of the master channel bank are usurped by channel bank expansion cards, which are respectively linked to associated subtended channel banks. In such an architecture, upstream-directed data passes from the customer interface into a line card of one of the subtended channel banks. From the line card, the data passes into the subtended channel bank's switch fabric, where the data is policed and scheduled for delivery to the network, via the master channel bank's network connection. However, before it is delivered to the network, the data is passed over the primary channel bank's bus into another switch fabric, where is again policed and scheduled. It is then passed onto the network connection for delivery to the network. Downstream-directed data enters the switch fabric of the master channel bank from the network connection, and is transferred therefrom down to a network card (which typically occupies two line card slots of the master channel bank), which passes the data on to the switch fabric of a subtended channel bank, for delivery to a line card of that channel bank. Every time data enters a subtended bank's switch fabric it is policed and scheduled.

The bus extension approach has a number of limitations. For example, given the fact that the extension bus is shared among the master channel bank and one or more expansion channel banks, a problem may arise if one of the channel bank cards malfunctions and seizes control of the extension bus. This could terminate or prevent data transfers on the shared bus. Moreover, since the channel banks are connected by way of a bus extension cable, there is a practical, noise-coupling limitation as to the number of channel banks that can be daisy chained together. In addition, the bus extension cable is usually bulky and expensive.

The network card extension approach is also limited by a number of factors. One is the fact that since the channel banks are interlinked by using network connections that usurp multiple line card slots, the primary bank loses the availability of line cards that would otherwise be used to provide service to customers. Also, the use of network cards adds a greater expense for data expansion, and limits the number of customers that can be serviced by the host channel bank. In addition, as each of the subtended channel banks requires a network connection, the switch fabric must be replicated on each subtended channel bank, which implies the need to replicate policing and scheduling mechanisms, and adds to the expense.

In accordance with the invention disclosed in the '101 application, these and other drawbacks of conventional channel bank expansion architectures are effectively obviated by a single switch fabric-based, multi-channel bank architecture, that contains a primary channel bank or master shelf, and one or more expansion channel banks or subtended expansion shelves, which are linked with the primary channel bank by way of upstream and downstream communication links, and distributed among which channel banks are respective policing engines and cell rate control mechanisms for controlling upstream-directed communications from customer ports to the network.

SUMMARY OF THE INVENTION

The present invention is particularly directed to a subtended shelf addressing and identification protocol employed by an inter-channel bank communication mechanism, which is readily installed in the multi channel bank digital subscriber line access multiplexer architecture of the type described in the '101 application. The protocol according to the present invention is operative to enable the control processor of a master shelf transceiver to selectively communicate with control processors of subtended slave channel bank transceiver, and preserves channel bank provisioning information, irrespective of a change in subtended shelf location or removal of a channel bank between the master and subtended shelves.

Pursuant to the inter-channel bank communication protocol of the invention, during an initialization routine for a respective shelf, the master channel bank assigns the expansion channel bank a shelf identifier or shelf ID code; the shelf ID code is the logical address of the expansion channel bank or shelf. Thereafter, the assigned shelf ID code is included as part of the header of any information packet between the master channel bank and an expansion channel bank. In addition, except for the special case of an initialization query or 'discovery' packet used by the master to locate an uninitialized expansion channel bank, whenever a packet is transmitted from the master channel bank to a downstream destination channel bank, the master channel bank inserts into the header a shelf address code representative of how many expansion shelves away the master believes the expansion channel bank to be. When a 'discovery' packet is transmitted by the master, the address and ID fields of the packet are set to all ones and there is no decrementing of the all ones address field by any expansion shelf.

As a packet is forwarded from the master downstream among the expansion shelves in a daisy chain manner, each expansion channel bank will compare its shelf ID code with the shelf ID field in the packet. If the two IDs match, the shelf captures the packet. In addition, irrespective of whether a shelf's ID code matches the shelf ID field of the packet, if the shelf address field of the packet has a prescribed value (a value of one) the shelf will capture the packet. The address field and the shelf ID enable the master to keep track of changes to the participation of expansion shelves within the overall system as will be described.

As noted above, the shelf address code is used to indicate the physical location of a expansion shelf relative to the master. Whenever a packet is sent by the master in a downstream direction to a destination expansion channel bank, the shelf address field is controllably decremented by a value of one by each intermediate s expansion shelf between the master shelf and the destination shelf. As a result, when the packet arrives at the destination shelf, the shelf address field should have a value of one. As pointed out above, the fact that the shelf address field has a value of one will cause the expansion channel bank to capture the packet.

In a complementary manner, whenever a packet is sent by an expansion channel bank in an upstream direction to the master channel bank, the shelf address field is initially set at a value of one by the packet-sourcing slave shelf. Thereafter, the shelf address field is controllably incremented by a value of one by each intermediate shelf between the packet-sourcing expansion shelf and the master shelf. As a result, when the packet arrives at the master shelf, the shelf address field will have a value indicating how many shelves away is the shelf sourcing the packet.

When an expansion shelf is initially inserted into a shelf bay and powered up, it is in an uninitialized state, with its shelf ID code yet to be assigned by the master. In accordance with the invention, an uninitialized shelf initially sets its shelf ID code to a default value of all ones. To locate any uninitialized shelf, the master transmits a 'discovery' or 'who are you?' packet, referenced above, in which both the address and ID fields of the packet are set to all ones. The manner in which the expansion shelves treat this packet is unique, as one of the rules of the messaging protocol is that no shelf is allowed to decrement an address field of all ones.

Since any uninitialized expansion shelf will have set its shelf ID code set to a default value of all ones, then, in response to receiving a 'discovery' packet from the master, the first uninitialized shelf in the downstream direction from the master will detect a match between its all ones shelf ID code and the all ones contents' of the shelf ID field in the 'discovery' packet, causing that uninitialized shelf to capture the 'discovery' packet. The uninitialized shelf responds to the 'discovery' packet by sending back a discovery reply packet to the master. Since the uninitialized shelf is sourcing a packet in the upstream direction, it will set the shelf address field to a value of one, as described above. In addition, since it has not yet been assigned a shelf ID code from the master, the replying shelf inserts its default ID code of all ones into the shelf ID field of the reply packet.

As the discovery reply packet is transmitted in the upstream direction to the master shelf, any intermediate shelf prior to the master will increment the packet's shelf address field by a value of one and pass the packet towards the master shelf. Upon receipt of the discovery reply packet from the uninitialized shelf, the master will know how far away the uninitialized shelf is by the contents of the shelf address field. Since the location of the uninitialized expansion shelf relative to the master shelf is now known, the master is able to initialize the expansion shelf, assigning it a shelf ID code.

For this purpose, the master will transmit an 'assign shelf ID' packet, whose shelf address field has a value corresponding to the contents of the shelf address field in the discovery reply packet which the master shelf received from the uninitialized shelf. The value of the 'assign shelf ID' packet's shelf ID field is quasi-arbitrary but, from a practical standpoint, may be chosen to match the shelf's physical address. In response to the receipt of the 'assign ID' packet from the master, the addressed shelf replaces its default shelf ID code value of all ones with its newly assigned shelf ID value for use in future communications with the master. It then sends a reply packet back to the master, in which the shelf address field is set to a value of one, and the shelf ID field has the value assigned to it by the master. As the reply packet is transmitted in the upstream direction to the master shelf, any intermediate shelf prior to the master will increment the packet's shelf address field by a value of one and pass the packet towards the master shelf. Upon receipt of the discovery reply packet from the uninitialized shelf, the master will know that the previously uninitialized shelf is now properly initialized. This completes the initialization procedure for that shelf.

If any other shelf is uninitialized, the master will again transmit a 'discovery' packet down the chain of expansion shelves. As noted above, only an uninitialized shelf awaiting initialization by the master will have its ID code set to all ones, so that only an uninitialized shelf will respond to a 'discovery' packet. It may be recalled that the shelf provisioning protocol of the present invention is such that no expansion shelf is allowed to decrement the all ones address field of a 'discovery' packet. This ensures that the master's 'discovery' packet will be relayed by respective initialized shelves unmodified until the packet reaches an uninitialized shelf and causes the routine described above to be carried out for that shelf. The master will know that all expansion shelves of the multi channel bank system have been initialized, when no response is received to a 'discovery' packet. The master may periodically issue a 'discovery' packet to find any new shelves, as well as shelves that may have reset themselves.

Because the DSLAM system is formed of a master shelf containing a master channel bank and some number of expansion shelves containing expansion channel banks that are connected together in a daisy chain manner, the possibility of a shelf becoming disconnected and then reconnected into a different order in the daisy chain sequence is relatively high. The use of a variable shelf address field and a fixed shelf ID field in the packet header enables the master shelf to determine if and where an expansion shelf has been moved. In fact, the communication and address protocol methodology of the invention allows all the shelves to be disconnected and shuffled to new locations; the master shelf is still able to keep up with their new locations through their shelf ID codes. When a replacement shelf is reinserted into the location of ad remove shelf, which may be its own or another, the newly inserted shelf will go through the shelf initialization routine described above, allowing the master to adjust back to the old shelf locations. The master shelf retains a subtended shelf's location in EEPROM, so that after a power cycle, the master will be able to promptly reconstruct a shuffled stack of expansion shelves with their corresponding shelf IDs.

BRIEF DESCRIPTION OF THE DRAWINGS

FIG. 5 shows a multi-byte header employed at the front end of packet that may be transmitted from the master shelf to a selected expansion shelf, and also within a response packet sourced from an expansion shelf to the master shelf;

FIG. 6 diagrammatically illustrates the four shelf system of FIG. 1, together with packet interface operations that take place along the downstream travel path of a packet through the shelves;

FIG. 7 diagrammatically illustrates the four shelf system of FIG. 1, together with packet interface operations that take place along the upstream travel path of a packet through the shelves;

FIGS. 8-11 show examples of the contents of shelf address and identification fields within the headers of packets used for the initialization of subtended expansion shelves of a multi channel bank DSLAM system; and FIG. 12 shows a modification of the four shelf DSLAM system of FIG. 1, in which the first expansion shelf has been removed.

DETAILED DESCRIPTION

Figure 1:
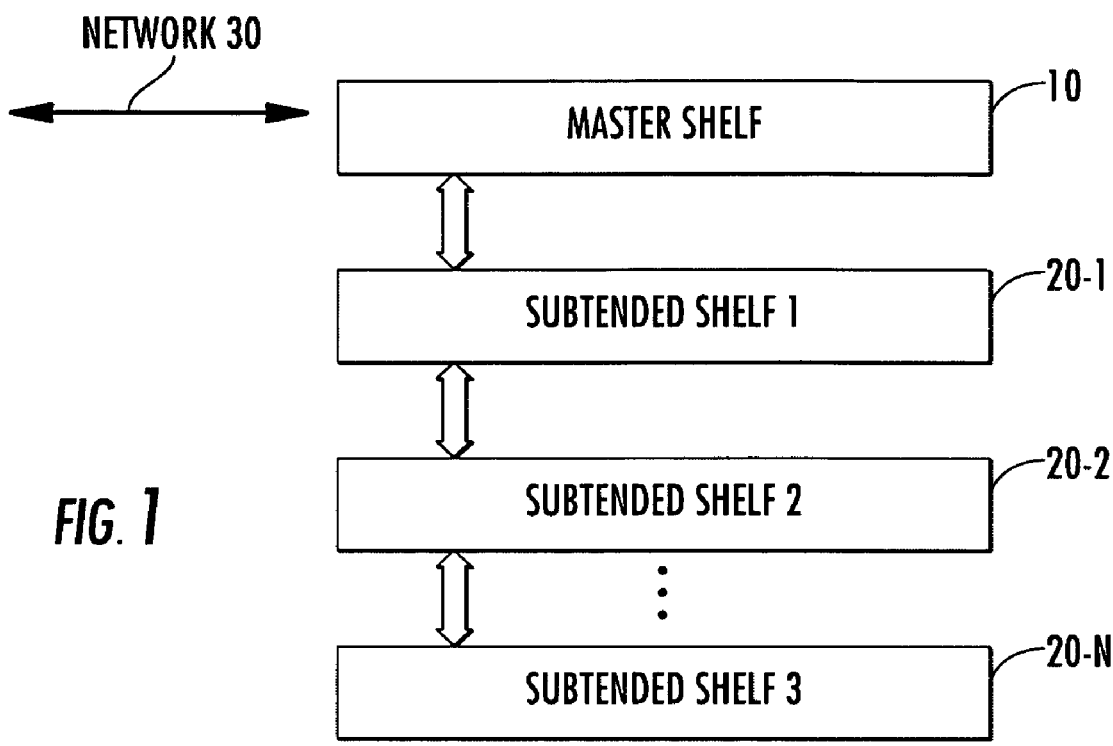
FIG. 1 is a reduced complexity block diagram of a single switch fabric-based, multi-channel bank DSLAM system architecture of the type disclosed in the above-referenced '101 application.

Before detailing the inter-shelf communication mechanism in accordance with the present invention, it should be observed that the invention resides primarily in communication control software, that is installable in supervisory communications microprocessor circuitry of a master channel bank and in subtended expansion channel banks of a multi-channel bank DSLAM communication system, particularly having a configuration as disclosed in the above-referenced '101 application. From a practical standpoint, the DSLAM system itself is preferably implemented using field programmable gate array (FPGA)—configured, application specific integrated circuit (ASIC) chip sets. In a hardware implementation of such chip sets, digital ASICs are preferred.

Consequently, the configurations of the master and expansion channel banks of the DSLAM system and the manner in which they may be interfaced with network and subscriber telecommunication channels have, for the most part, been shown in the drawings by readily understandable block diagrams, and prescribed address and identification fields of the header portions of information packets that are exchanged between the master shelf and the subtended expansion shelves, so as not to obscure the disclosure with details which will be readily apparent to those skilled in the art having the benefit of the description herein. Thus, the block diagrams of respective upstream and downstream communication paths of the DSLAM system are primarily intended to show the system's major components in convenient functional groupings, whereby the present invention may be more readily understood.

Attention is initially directed to FIG. 1, which is a reduced complexity block diagram of a single switch fabric-based, multi-channel bank DSLAM system architecture of the type disclosed in the above-referenced '101 application. As shown in FIG. 1, the system includes an uppermost or top (as viewed in the drawing) equipment shelf or channel bank 10 and one or more downstream or subtended, expansion shelves (channel banks) 20-1, 20-2, . . . , 20-N. The top channel bank 10 serves as the system's primary or master shelf, and contains the switch fabric through which communications between an external network 30, such as an OC3 or DS3 network operating at 44.736 Mbps, and line card ports of the various equipments shelves (including those of the primary shelf or channel bank 10 and those of the subtended shelves or channel banks 20) are effected.

Figure 2:
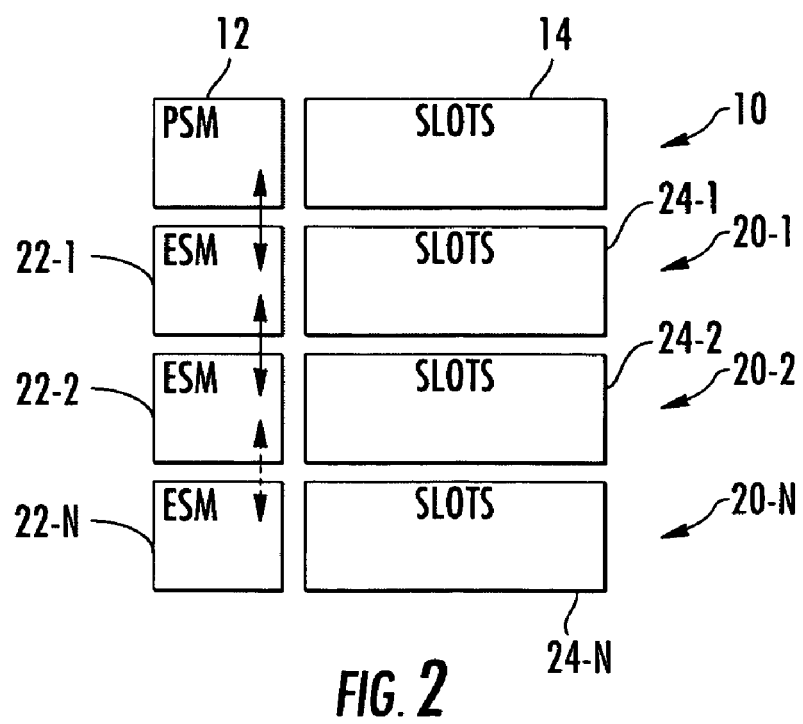
FIG. 2 is a diagram of the system architecture of FIG. 1, showing multiplexer switch modules through which upstream and downstream communications are conducted among the channel banks.

As diagrammatically illustrated in FIG. 2, to provide for the flow of data between the master shelf and the auxiliary or subtended expansion shelves, the master shelf 10 includes a primary switch module (PSM) 12, while the subtended shelves include respective expansion shelf modules 22-1, 22-2, . . . , 22-N. The master shelf includes a set of line card slots 14, which retain line cards, ports of which serve associated customers. Similarly, the subtended shelves include sets of line cards 24-1, 24-2, . . . , 24-N.

Figure 3:
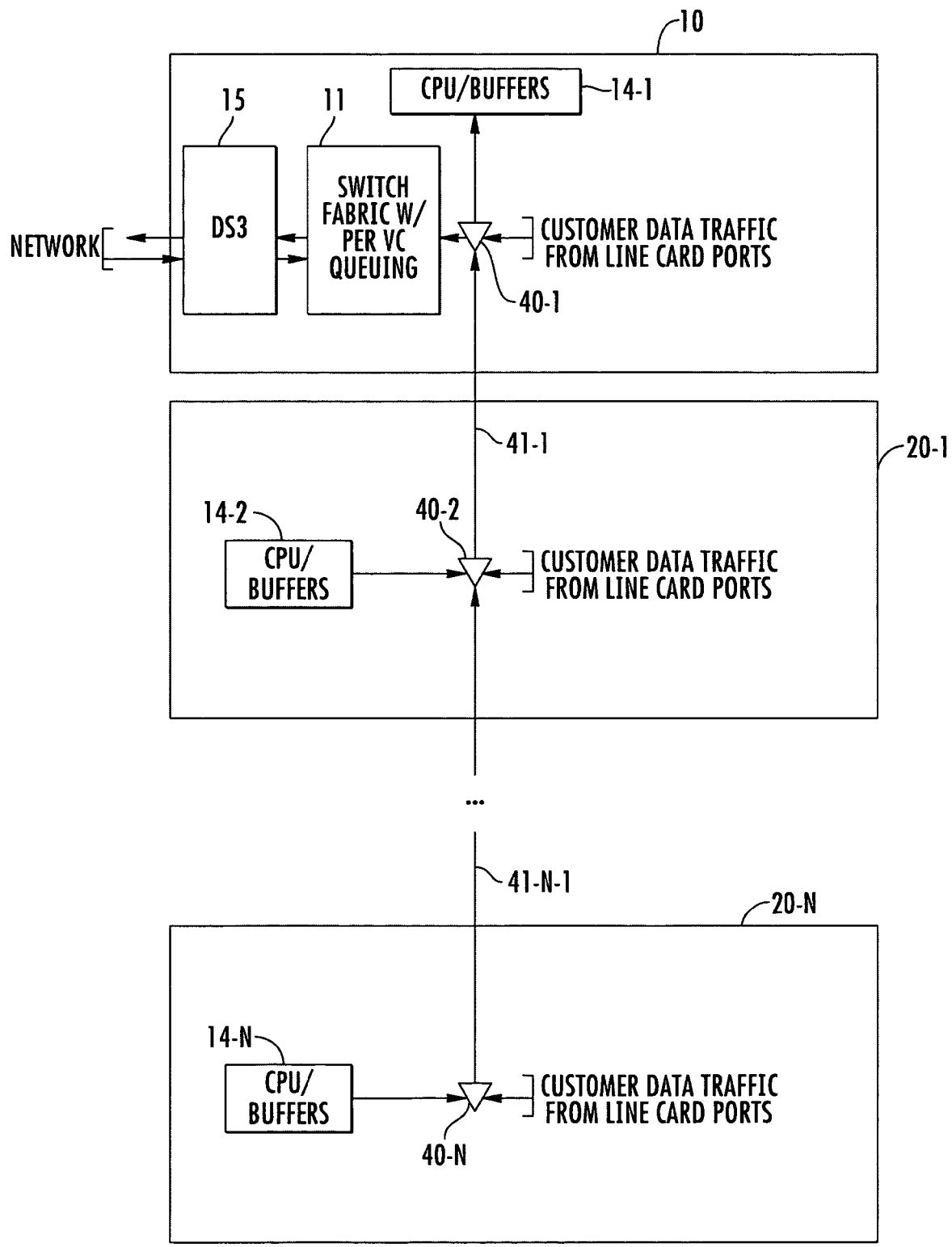
FIG. 3 is an upstream communication path diagram of the multi-channel bank DSLAM system architecture of FIGS. 1 and 2.

The PSM 12 of the master channel bank is coupled with the switch fabric resident in that shelf and includes a set of upstream and downstream multiplexers. The upstream multiplexer, shown at 40-1 in the upstream communication path diagram of FIG. 3, is used for upstream communications with the expansion shelves. The downstream multiplexer, shown at 50-1 in the downstream communication path diagram of FIG. 4, is used for downstream communications with the expansion shelves.

The master channel bank and the expansion channel banks are linked by way of respective upstream and downstream communication links 41 and 51. The upstream link 41 is coupled with upstream multiplexers 40-2, . . . , 40-N that are contained in the expansion switch modules of the expansion equipment shelves, while the downstream link 51 is coupled with the downstream multiplexers 50-2, . . . , 50-N of the expansion switch modules within the expansion equipment shelves. Each of upstream and downstream communication links 41 and 51 is preferably configured as a Giga-bit Media Independent Interface (GMII).

As shown in FIG. 3, the upstream communication multiplexer 40-1 of the master equipment shelf has four ports. One port is coupled to receive customer data from associated line card ports of that equipment shelf; a second port is supplied from the upstream GMII segment 41-1 from the next lowest (expansion) equipment shelf 20-1; a third port is coupled to a CPU/buffer 14-1; and a fourth port is coupled to the switch fabric 11, which is coupled with a network interface 15.

Figure 4:
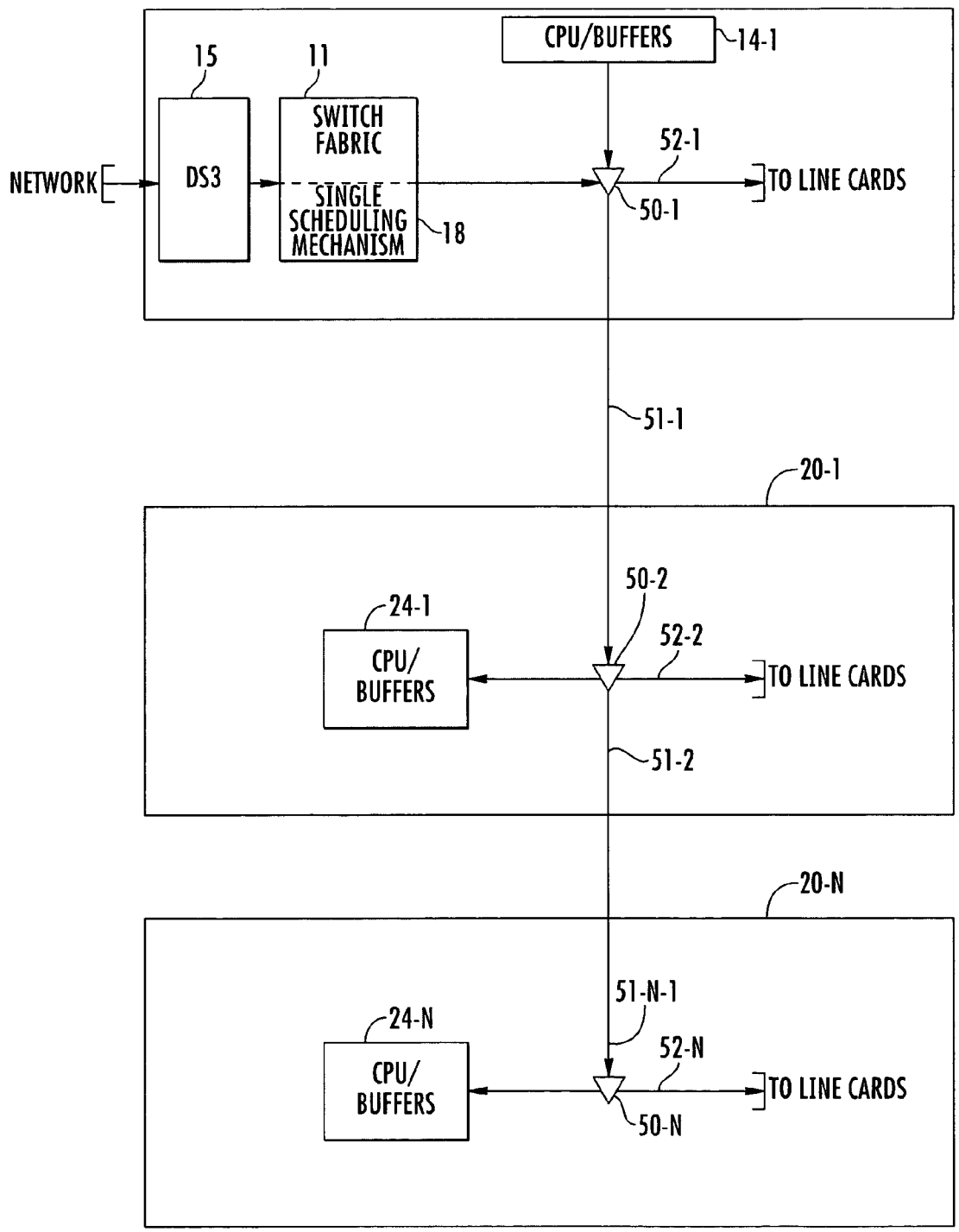
FIG. 4 is a downstream communication path diagram of the multi-channel bank DSLAM system architecture of FIGS. 1 and 2.

Similarly, as shown in FIG. 4, the downstream communication multiplexer 50-1 of the master equipment shelf 10 has four ports: a first port is coupled to the master shelf's CPU/buffer 14-1; a second port is coupled to a downstream communication scheduler 18, which is coupled with the switch fabric 11; a third port is coupled via the backplane 52-1 to the line cards of the primary equipment shelf; and a fourth port is coupled to downstream GMII segment 51-1, which is coupled to the expansion switch module (ESM) of the immediately adjacent downstream expansion shelf 20-1.

To effect communications between the master shelf and respective ones of the expansion shelves 20-1, . . . , 20-N, each expansion shelf employs an expansion switch module (ESM), which is similar to the primary switch module of the master channel bank. A respective expansion switch module contains multiplexer circuitry through which upstream and downstream directed communications are conducted over the respective GMII upstream and GMII downstream segments 41 and 51, respectively. To this end, using the first subtended channel bank 20-1 as an example, it's expansion switch module contains an upstream communication multiplexer 40-2 having four ports. A first port is coupled to receive customer data supplied from associated line cards of that equipment shelf. A second port is coupled with a local CPU/buffer of that channel bank. A third port is coupled to receive data supplied via an upstream GMII segment 41-2 from the next lowest expansion shelf 20-2 (if installed); and a fourth port is coupled is coupled to the upstream GMII segment 41-1 to the next higher equipment shelf (here the master shelf 10).

For downstream-directed communications, again using the first subtended channel bank 20-1 as an example, its expansion switch module contains a four port downstream communication multiplexer 50-2. A first of its four ports is coupled to receive an input from the downstream segment 51-1 of the GMII from the next highest equipment shelf (which is the master shelf 10 in the present example). A second port is coupled to that shelf's CPU/buffer 24-1. A third port is coupled to the downstream segment 51-2 of the GMII to the next lowest equipment shelf (if employed); and a fourth port is coupled to the backplane 52-2 through which output data is coupled to associated ports of the line cards installed within that shelf's backplane.

As pointed out briefly above, the present invention is directed to a prescribed addressing and identification protocol employed within an inter-shelf communication mechanism, that is used to conduct upstream and downstream inter-shelf communications in a multi-shelf DSLAM system of the type described above. The communication protocol according to the invention is effective to enable the control processor (containing a CPU and associated buffer circuitry) of the master shelf to selectively communicate with the control processor (containing a CPU and associated buffer circuitry) of any subtended expansion shelf, in a master/slave relationship, while preserving provisioning information supplied to the expansion shelves from the master, irrespective of a change in shelf location or removal of a shelf installed between the master shelf and one or more other channel banks.

As noted previously, pursuant to the inter-shelf communication mechanism of the invention, the master shelf assigns each subtended expansion channel bank a shelf identifier code (or shelf ID code), which is to be included as part of the header of any information packet between the master shelf and a subtended channel bank. Whenever a message is transmitted downstream from the master, a respective subtended channel bank will compare the shelf ID code it has previously been assigned by the master with the shelf ID field in the packet. If the two IDs match, the shelf captures the packet. In addition, irrespective of whether a shelf's ID code matches the shelf ID field of the packet, if the shelf address field of the packet has a prescribed value (e.g., a value of one), the subtended shelf will capture the packet. As will be described, the shelf address field enables the master to keep track of changes to the participation of subtended shelves within the overall system.

The shelf address field of a packet issued by the master channel bank is used to indicate the physical location of the destination subtended shelf relative to the physical location of the master. The contents of this field are controllably incremented or decremented by one or more intermediate shelves in the course transport of the packet between the master shelf and a destination shelf. The shelf identification or ID code which, in general, is not subject to change, and which is also included as part of a packet header, is the logical address assigned to the subtended shelf by the master in the course of its initializing that shelf. The manner in which these two codes (shelf address code and identification (ID) code) are generated and employed in accordance with the present invention is described in detail below.

Attention is now directed to FIG. 5, which shows a multi-byte header that is employed at the front end of packet that may be transmitted from the master shelf to a selected subtended shelf, and also within a response packet sourced from a subtended shelf to the master shelf. As shown in FIG. 5, the packet header includes an acknowledge bit (ACK) that is used to acknowledge the successful reception of a packet; receipt of this packet implies that another packet may be sent. The ACK bit is followed by a not-acknowledge bit (NAK) that is used to indicate that the last packet was received in error and requires retransmission.

A multi-bit shelf address field, shown as comprising three address bits AD1, AD2 and AD3, is normally used to specify the physical location of a subtended shelf relative to the master. It should be noted that the number of bits that make up the shelf address field and also the shelf identification field to be described is not limited to three or any other number. Three is a practical number as it readily accommodates a DSLAM system comprised of a master shelf and up to six expansion shelves. The bit pattern 111 is reserved for a special case for 'discovery' packets, as will be described.

In the downstream direction, except for the special case of a 'discovery' or 'who are you?' initialization query packet (wherein the shelf address field is set to all ones), the value of the shelf address field for a packet sourced from the master is initially set at a value that corresponds to what the master believes to be the physical location of the destination subtended shelf relative to the master shelf (namely how many shelves away from the master is the destination shelf). Thus, if the destination shelf is two shelves away from the master, the master will set the shelf address field to a value of two. Also, except for the special case of a 'discovery' packet, in the course of a packet being relayed in the downstream direction, the value of the packet's shelf address field is decremented by a value of one by each shelf that is located between the master shelf and the destination shelf. This should ultimately cause the value of the shelf address field to have a value of one when the packet arrives at its intended subtended shelf destination. For the case of a 'discovery' packet, the all one's value of the address field is not decremented.

In the upstream direction, the value of the address field is always initially set at a value of one by the subtended shelf sourcing the packet. The address field of this packet is then incremented by a value of one by each shelf that is located between the sourcing shelf and the master shelf. As a consequence, when the packet arrives at the master shelf, the value of its address field will specify the physical location of the sourcing shelf relative to the master (namely, how many shelves away from the master is the sourcing shelf).

A multi-bit logical identification (ID) field, comprising three bits ID1, ID2 and ID3, is used by the master to identify the downstream subtended shelf for whom the packet is destined, and is used by a subtended shelf to inform the master from which shelf did the packet originate. Whenever a packet is received by a subtended shelf, that shelf compares the ID field of the packet with its shelf ID code. That shelf's ID code will either have been previously assigned to it by the master (during an initialization routine, to be described), or has the value of all ones, associated with the fact that the subtended shelf is currently uninitialized. Whenever the ID field matches the expansion shelf's ID code, that shelf will capture the message. In addition to capturing a packet whose ID field matches its shelf ID code, a subtended shelf will also capture a packet whose address field equals the value of one. As will be described, this enables the master shelf to keep track of which shelves physically occupy which shelf locations, and accommodates removal or rearranging of the shelf connections to the daisy chained upstream and downstream communication paths.

A two bit control field comprised of control field bits is used to indicate the beginning, middle and end of a given message, while a six bit process identification field is used to specify a higher level process for which the data packet is intended. When a shelf acknowledges a packet, it mirrors back the process ID field of the packet it has just received.

As pointed out briefly above, it is the shelf address and the shelf ID fields of the packet header, and the manner in which the shelf address field is selectively modified at a respective subtended shelf in accordance with the addressing protocol of the present invention, which enables the functionality of the invention to be successfully implemented. To illustrate the operation of the addressing protocol employed by the present invention, consider the four shelf system shown in FIG. 6, which effectively corresponds to the four shelf system of FIG. 1, having a master shelf 10 and three expansion shelves 20-1, 20-2 and 20-3, and also shows packet interface operations that take place along the downstream travel path of a packet through the shelves.

Pursuant to the present example, let it be initially assumed that the master shelf 10 intends to communicate with the farthest away subtended shelf (the third shelf 20-3 in the example of FIG. 6). In this case, the master shelf sets the address field of the downstream directed packet to a value of three (011), sets the ID field to the ID of shelf 20-3 (e.g., 011), and forwards the packet to the first downstream shelf 20-1. The first shelf reads the contents of the shelf ID field as well as the address field (which is three (011) in the present example). Since the packet's shelf ID field does not match the shelf ID code (001) of the first shelf, and the packet's shelf address field is not equal to a value of one, the first shelf knows that the message is not intended for it. Shelf 20-1 therefore decrements the current value (three (011)) of the packets shelf address field by a value of one, leaving a shelf address field value of two (010), and relays the packet on downstream to the second subtended shelf 20-2.

As is the case with the first subtended shelf 20-1, the second shelf 20-2 reads the contents of the packet's shelf ID field (011) and also the contents of the shelf address field (which has been decremented to a value of two (010)). Since the shelf ID field (011) does not match the shelf ID (010) of the second shelf 20-2, and since the shelf address field is not equal to a value of one, the second shelf 20-2 knows that the message is not intended for it. Therefore, like the first shelf 20-1, shelf 20-2 responds to the packet by decrementing the contents of the shelf address field by a value of one, so as to produce a packet having its shelf address field equal to a value of one (001). Shelf 20-2 then relays the packet downstream to the third subtended shelf 20-3.

When the packet arrives at the shelf 20-3, that shelf reads contents (011) of the shelf ID field and the contents of the shelf address field (which has been decremented to a value one (001) by the second channel bank 20-2). When the third shelf 20-3 sees that the contents (011) of the shelf ID field matches its ID code (011), it knows that the message is intended for it. Shelf 20-3 therefore captures the packet. Moreover, even if, for some reason, the shelf ID field did not match the ID code of the third shelf, shelf 20-3 would still capture the packet, since the value of the address field equals one. The use of this 'address equals one' packet capture rule to inform the master of a change in system configuration will be discussed below.

FIG. 7 shows a packet transport communication that is complementary relative to the example of FIG. 6. Namely, FIG. 7 illustrates the case of transmitting a packet from the third subtended shelf 20-3 upstream to the master shelf 10. As noted above, (in addition to inserting its ID code in the packet header shelf ID field) any shelf sourcing a response packet to the master initially sets the address field of the packet equal to a value of one (011). Then, as the packet is relayed upstream, each successive intermediate expansion shelf between the packet-sourcing shelf and the master shelf will increment the contents of the packet's shelf address field by a value of one and send the packet upstream to the next shelf.

For the three subtended shelf example of FIG. 7, the number two shelf 20-2 will increment the contents of the packet's shelf address field from its initial value of one (001) to a value of two (010), and then forward the packet to the next shelf in the upstream direction—subtended shelf 20-1. Shelf 20-1 also increments the contents of the packet's shelf address field (having a value of two (010)) by a value of one, so that the contents of the shelf address field becomes a value of three (011). Shelf 20-1 then forwards the packet to the master. When the packet arrives at the master shelf, its address field has a value of three (011), which informs the master that the packet-sourcing shelf is three units downstream from it, namely, expansion shelf 20-3. The shelf ID field also informs the master that the shelf installed in shelf bay number three has a shelf ID code of three, as the master shelf would normally expect.

In addition to successive modification (incrementing in the upstream direction and decrementing in the downstream direction) of the contents of the packet's shelf address field to indicate to whom a packet is to be delivered and from whom a packet is sourced, the present invention also keeps track of installed equipment shelves by means of the shelf ID field, which is downloaded from the master when a subtended shelf is initialized. To gain an appreciation of the use of this shelf ID field in conjunction with the shelf address field, the manner in which the shelf address and shelf ID fields are generated and used will now be described.

As noted previously, when an expansion shelf is initially inserted into a subtended shelf bay and is powered up, that shelf is in an uninitialized state, with its shelf ID code yet to be assigned. In accordance with the invention, an uninitialized shelf initially sets its shelf ID code to a prescribed default value, e.g., all ones (111). In order to initialize a subtended expansion shelf, the master shelf sends a unique 'discovery' or 'who are you?' packet, in which both the shelf address and shelf ID fields are set to all ones, as shown in FIG. 8. As noted above, this packet is unique, as one of the rules of the messaging protocol is that no shelf is allowed to decrement a packet shelf address field of all ones.

The first uninitialized shelf in the downstream direction from the master shelf will have its shelf ID code set to a default value of all ones (111), as noted above. As a result, in response to receiving a 'discovery' packet from the master, the uninitialized shelf will detect a match between its all ones (111) shelf ID code and the all ones (111) contents of the shelf ID field in the 'discovery' packet. As a consequence the uninitialized shelf will capture the 'discovery' packet. In accordance with the invention, the uninitialized shelf responds to the receipt of a 'discovery' packet by sending back a reply packet to the master. Since the uninitialized shelf is the one sourcing the packet in the upstream direction, then, pursuant to the communication protocol described above, it sets the packet's address field to a value of one (001). In addition, since it has not yet been assigned a shelf ID from the master, it inserts the default shelf ID code of all ones (111) into the shelf ID field of the reply packet, as shown in FIG. 9.

As the reply packet is transmitted in the upstream direction to the master shelf, any intermediate shelf prior to the master will proceed in the manner described earlier, incrementing the contents of the packet's shelf address field by a value of one, and then passing the packet towards the master shelf. Upon receipt of the reply packet from the uninitialized shelf, the master will know how far away the uninitialized shelf is from the master by the value the reply packet's shelf address field, as described above. Since the location of the uninitialized subtended shelf relative to the master shelf is now known, the master is able to initialize the expansion shelf, assigning it a shelf ID.

As a non-limiting example, let it be assumed that the uninitialized shelf happens to be the first expansion shelf (shelf 20-1), which is the closest expansion shelf to the master. This means that the original contents (001) of the address field in the reply packet will not have been incremented prior to arrival of the reply packet at the master, so that the master knows that the uninitialized shelf is the first expansion shelf 20-1. In order to initialize this shelf, the master will transmit an 'assign shelf ID' packet, whose shelf address field has a value of one (001)—corresponding to the contents of the shelf address field in the reply packet which the master shelf has received from the first subtended shelf 20-1, as described above.

Figures 10, 11, 12:
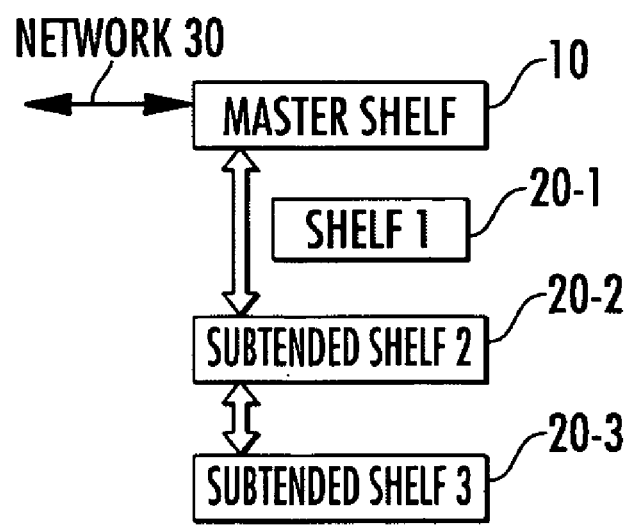

The value of the shelf ID code is quasi-arbitrary; from a practical standpoint, it is preferably chosen to match the physical address, namely it has a value of one (001), as shown in FIG. 10. In response to this 'assign ID' packet, the addressed shelf (shelf 20-1) replaces its default ID code of all ones (111) with its newly assigned value of one (001) for use in future communications with the master. It then sends a reply packet to the master, in which each of the address field and the ID field has a value of one (001), as shown in FIG. 11. This completes the initialization procedure for the first shelf.

If any other shelf is uninitialized, the master will proceed to send the 'discovery' message down the chain of subtended shelves. As described above, only a shelf awaiting initialization by the master will have its shelf ID code set to a value of all ones (111), so that only an uninitialized shelf will respond to the 'discovery' packet. It may be recalled that the shelf provisioning protocol of the present invention is such that no shelf is allowed to decrement the all ones address field of a 'discovery' packet. This ensures that the 'discovery' packet will be relayed by respective initialized shelves unmodified until the packet reaches an uninitialized shelf and causes the routine described above to be carried out for that shelf. The master will know that all subtended shelves of the multi channel bank system have been initialized, when no response is received to a 'discovery' packet. The master may periodically issue a 'discovery' packet to find any new shelves, as well as shelves that may have reset themselves (for example, due to a watchdog time out, and the like).

Because the DSLAM system is formed of a primary shelf and some number of expansion shelves that are connected together in a daisy chain manner, as by way of front panel connectors (typically RJ-45 connectors), the possibility of a shelf becoming disconnected and then reconnected into a different order in the daisy chain sequence is relatively high. Fortunately, the use of a variable shelf address field and a fixed shelf ID field in the packet header is able to successfully enable the master shelf to determine if and where a subtended shelf has been moved.

Consider, for example, the four shelf system shown in FIG. 1, comprised of a master shelf 10 and the three subtended shelves 20-1, 20-2 and 20-3. Now let it be assumed that subtended shelf 20-1 needs to be replaced, while the remaining two shelves 20-2 and 20-3 are to remain connected to the master shelf. For this purpose, the technician replaces the connection between the master shelf 10 and the first subtended shelf 20-1 with a connection from the master shelf 10 to the second subtended shelf 20-2, as shown in FIG. 12. With this rewired configuration, it is intended that the DSLAM system continue to pass data to the customers being serviced by subtended shelves 20-2 and 20-3.

When the master polls shelf 20-1, it will notice that the shelf ID field of the response packet contains the shelf ID code for subtended shelf 20-2, rather than the shelf ID code for removed shelf 20-1. Since the ID code for the second shelf 20-2 is not what the master expected, the master now knows that shelf 20-1 has been moved and that the closest subtended shelf is shelf 20-2, rather than shelf 20-1. The master shelf now knows that to communicate with subtended shelf 20-2, it must insert a value of one (001) in the packet's shelf address field and a value of two (010) in the shelf ID field of the header of a packet intended for shelf 20-2. Operating in this manner will still allow the shelves to be referenced by their original shelf ID codes, namely menus can continue to refer to shelf 20-2 as shelf 20-2, even though shelf 20-2 now physically occupies the location of previous shelf 20-1.

The address mechanism described above allows all the shelves to be disconnected and shuffled to new locations; still the master shelf is able to keep up with their new locations because of the ID fields. When a replacement shelf is reinserted into the location of shelf 20-1, it will go through the shelf initialization routine described above, allowing the master to adjust back to the old shelf locations. The master shelf retains a subtended shelf's location in EEPROM, so that after a power cycle, the master will be able to promptly reconstruct a shuffled stack of subtended shelves with their corresponding shelf IDs.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of conducting communications between a master transceiver and one of a plurality of destination slave transceivers using a digital communication link comprising the steps of:

(a) at said master transceiver, transmitting toward a destination slave transceiver an information packet having a slave transceiver address field and a slave transceiver identification field, said slave transceiver address field containing a slave transceiver address code representative of the physical location of said destination slave transceiver relative to the physical location of said master transceiver, and said slave transceiver identification field containing a slave transceiver identification code representative of a logical address of said destination slave transceiver;

(b) at a respective slave transceiver between said master transceiver and said destination slave transceiver, receiving said information packet, modifying the value of said slave transceiver address field of said information packet to produce a modified information packet, and transmitting said modified information packet toward said destination slave transceiver; and (c) at said destination slave transceiver, capturing said modified information packet, in response to contents of the the slave transceiver identification field of said modified packet matching a slave transceiver identification code representative of a logical address of said destination slave transceiver, or in response to said slave transceiver address field of said information packet having a prescribed value.

2. The method according to claim 1, wherein step (b) comprises decrementing the value of said slave transceiver address field of said information packet to produce said modified information packet, and transmitting said modified information packet toward said destination slave transceiver, and step (c) comprises capturing said modified information packet, in response to contents of the slave transceiver identification field of said modified packet matching a slave transceiver identification code representative of a logical address of said destination slave transceiver, or in response to said slave transceiver address field of said information packet having a value of one.

3. The method according to claim 1, further including the steps of:

(d) at said destination slave transceiver, transmitting toward said master transceiver a reply packet having a slave transceiver address field and a slave transceiver identification field, said slave transceiver address field containing a prescribed digital value, and said slave transceiver identification field containing a slave transceiver identification code representative of said logical address of said destination slave transceiver;

(e) at a respective slave transceiver between said destination slave transceiver and said master transceiver, receiving said reply packet, modifying the value of said slave transceiver address field of said reply packet to produce a modified reply packet, and transmitting said modified reply packet toward said master transceiver; and (f) at said master transceiver, capturing said modified reply packet, and determining the physical location of said destination slave transceiver relative to said master transceiver, in accordance with the value of said slave transceiver address field of said modified reply packet.

4. The method according to claim 3, wherein said prescribed digital value is a value of one, and wherein, in step (f), said master transceiver determines the physical location of said destination slave transceiver to be displaced M transceiver locations away from said master transceiver, where M corresponds to the contents of said slave transceiver address field of said modified reply packet.

5. The method according to claim 1, further comprising the step of:

(d) initializing an uninitialized slave transceiver by performing the steps of:

(d1) at said uninitialized slave transceiver, storing a prescribed default value as an uninitialized slave transceiver identification code;

(d2) at said master transceiver, transmitting an initialization query packet having a slave transceiver address field containing a first prescribed code, and a slave transceiver identification field containing said prescribed default value;

(d3) at said uninitialized slave transceiver, capturing said initialization query packet, in response to contents of the slave transceiver identification field of said initialization query packet matching said prescribed default value, and transmitting a reply packet to said master transceiver, said reply packet having a slave transceiver address field set to a prescribed value, and a slave transceiver identification field set to said prescribed default value; and (d4) at a respective slave transceiver between said uninitialized slave transceiver and said master transceiver, receiving said reply packet, modifying the value of said slave transceiver address field of said reply packet to produce a modified reply packet, and transmitting said modified reply packet toward said master transceiver; and (d5) at said master transceiver, capturing said modified reply packet, and transmitting an initialization packet having a slave transceiver address field containing the contents of the slave transceiver address field of the reply packet received by said master transceiver, and a slave transceiver identification field containing a logical address for assignment to said uninitialized slave transceiver.

6. The method according to claim 1, wherein said master transceiver corresponds to a master equipment shelf of a digital subscriber line access multiplexer (DSLAM), which is coupled to a telecommunication network and contains line card ports serving associated customers of said system, and wherein a respective one of said plurality of slave transceivers corresponds to a slave equipment shelf containing line card ports serving associated customers of said system.

7. A method of initializing an uninitialized slave transceiver of a plurality of slave transceivers, so that a master transceiver may conduct communications with said uninitialized slave transceiver over a digital communication link, said method comprising the steps of:

(a) at said uninitialized slave transceiver, storing a prescribed default value as an uninitialized slave transceiver identification code;
(b) at said master transceiver, transmitting an initialization query packet having a slave transceiver address field containing a first prescribed code, and a slave transceiver identification field containing said prescribed default value;
(c) at a respective slave transceiver between said master transceiver and said uninitialized slave transceiver, relaying said initialization query packet toward said uninitialized slave transceiver;
(d) at said uninitialized slave transceiver, capturing said initialization query packet, in response to contents of the slave transceiver identification field of said initialization query packet matching said prescribed default value, and transmitting a reply packet to said master transceiver, said reply packet having a slave transceiver address field set to a prescribed value different from said first prescribed code, and a slave transceiver identification field set to said prescribed default value;
(e) at a respective slave transceiver between said uninitialized slave transceiver and said master transceiver, receiving said reply packet, modifying the value of said slave transceiver address field of said reply packet to produce a modified reply packet, and transmitting said modified reply packet toward said master transceiver; and
(f) at said master transceiver, capturing said modified reply packet, and transmitting an initialization packet having a slave transceiver address field containing the contents of the slave transceiver address field of the reply packet received by said master transceiver, and a slave transceiver identification field containing a logical address for assignment to said uninitialized slave transceiver.

8. The method according to claim 7, further comprising the steps of:
(g) at a respective slave transceiver between said master transceiver and said uninitialized slave transceiver, receiving said initialization packet, modifying the value of said slave transceiver address field of said initialization packet to produce a modified initialization packet, and transmitting said modified initialization packet toward said destination slave transceiver; and
(h) at said uninitialized slave transceiver, capturing said modified initialization packet, in response to the contents of said slave transceiver address field of said modified initialization packet having a predetermined value, and transmitting an initialization response packet to said master transceiver, said initialization response packet having a slave transceiver address field set to said predetermined value, and a slave transceiver identification field set to said logical address.

9. The method according to claim 8, wherein step (g) comprises decrementing the value of said slave transceiver address field of said initialization packet to produce said modified initialization packet, and transmitting said modified initialization packet toward said uninitialized slave transceiver.

10. The method according to claim 9, wherein said predetermined value is one.

11. The method according to claim 7, wherein said master transceiver corresponds to a master equipment shelf of a digital subscriber line access multiplexer (DSLAM), which is coupled to a telecommunication network and contains line card ports serving associated customers of said system, and wherein a respective one of said plurality of slave transceivers corresponds to a slave equipment shelf containing line card ports serving associated customers of said system.

12. In a digital subscriber line access multiplexer (DSLAM) coupled to a telecommunication network, including a master equipment shelf and a plurality of slave equipment shelves having shelf controllers which are adapted to communicate with a controller of said master equipment shelf by way of digital communication path linking said master equipment shelf with said plurality of slave equipment shelves, said master equipment shelf including line card ports serving associated customers of said system, and respective ones of said slave equipment shelves containing line card ports serving associated customers of said system, a method of conducting communications between the controller of a slave equipment shelf and the controller of said master equipment shelf, comprising the steps of:
(a) at said message-sourcing slave equipment shelf, transmitting an information packet toward said master equipment shelf, said information packet having a shelf address field containing a prescribed code, and a slave equipment shelf identification field containing a slave equipment shelf identification code representative of a logical address of said message-sourcing slave equipment shelf;
(b) at each slave equipment shelf between said message-sourcing slave equipment shelf and said master equipment shelf, modifying the value of said shelf address field of said information packet to produce a modified information packet, and transmitting said modified information packet toward said master equipment shelf; and
(c) at said master equipment shelf, capturing said modified information packet, and determining the location of said message-sourcing slave equipment shelf relative to said master equipment shelf by the value of the shelf address field of said modified information packet, and determining the logical address of said message-sourcing slave equipment shelf by contents of said slave equipment shelf identification field.

13. The method according to claim 12, wherein said prescribed code has a value of one.

14. The method according to claim 12, wherein step (b) comprises incrementing the value of said slave shelf equipment address field to produce said modified information packet, and transmitting said modified information packet toward said master equipment shelf.

15. The method according to claim 14, wherein said prescribed code has a value of one, and wherein, in step (c), said master equipment shelf determines the physical location of said slave equipment shelf to be displaced M shelf locations of currently active slave equipment shelves away from said master equipment shelf, where M corresponds to the contents of the shelf address field of said modified information packet.

* * * * *